Aug. 15, 1944.  R. M. EVANS  2,355,636

PHOTOGRAPHIC MASKING

Filed June 6, 1942

Fig. 1 — STRIP OF COLORED MOTION PICTURE FILM. 10

Fig. 2 — DENSITY VARIATION DUE TO THICKNESS. (IMAGE VARIATIONS NOT SHOWN.) 20

Fig. 3 — DYED FILM. 11

Fig. 4 — ACCENTUATED VARIATION DUE TO THICKNESS. 21

Fig. 5 — 40% MASK FROM DYED FILM. 13

Fig. 6 — MASK DENSITY. (THICKNESS TYPE VARIATION ONLY.) 22

Fig. 7 — 14, 13, 12

Fig. 8 — DENSITY OF COMBINATION. (THICKNESS TYPE VARIATION ONLY.) 23

Fig. 9 — PRINT FROM COMBINATION. COLOR AND FLICKER CORRECTED. 15

UNIFORM DYEING
BLEACHING DYE
REGISTERING MASK

RALPH M. EVANS
INVENTOR

BY WM. Perrins
F. M. Emerson Holmes
ATT'Y. & AG'T.

Patented Aug. 15, 1944

2,355,636

UNITED STATES PATENT OFFICE 2,355,636

PHOTOGRAPHIC MASKING

Ralph M. Evans, Rochester, N. Y., assignor to Eastman Kodak Company, Rochester, N. Y., a corporation of New Jersey Application June 6, 1942, Serial No. 446,086

11 Claims. (Cl. 95—2)

This invention relates to printing from photographic transparencies particularly to masking during printing.

It is the main object of the invention to provide an improved method of masking, particularly a method which will differentiate between two or more types of errors to be corrected.

It is a specific object of the invention to provide a method for reducing errors due to variations in thickness of the original transparency, that is, variations in thickness of the layer in which the image is recorded, for example, an emulsion layer. One particular purpose accomplished by this feature of the invention, is the reduction of flicker in motion pictures. This does not refer to the flicker apparent when a projector is operating below the critical flicker frequency, but does refer to that caused by overall changes in density in which the change extends over several frames of the film.

One of the most important objects of the invention is to combine this correction of flicker or thickness variations with the correction of color necessary in the printing of colored motion pictures.

The broad object of the invention is accomplished by modifying the optical transmission of the original transparency and then making a mask from the modified transparency and negative thereto. That is, the mask is negative if the transparency is positive and vice versa. After the mask is made the transparency is restored to its original form. This restored transparency is then combined with the mask in masking register and a print made from the combination.

One application of this invention is for correction of density variations due to thickness. Such variations are superposed on those due to the recorded image itself and are noticeable when a series of frames are projected as in motion pictures. For example, if there is an increase in density due to thickness, the effect is more or less proportional so that a low image density is increased by a small amount say 10% and a high image density is increased by a large amount, approximately 10% of the high value. The only way to see variations due to thickness separately, is to flash the film to a uniform light without any image being recorded therein and then to process this uniformly exposed film. However, this same variation exists even when an image is present and in this case, it can be corrected by the following form of the present invention.

The transparency is dyed or otherwise modified to accentuate the variations due to thickness by a factor F different from unity, preferably greater than unity (the reason for this preference will be apparent below). A mask is then printed from this accentuated transparency with a gamma of 1/F. The mask is made negative with respect to the transparency. The transparency itself is then restored, for example, by bleaching out the accentuating dye, substantially to its original form. The mask now has density variations proportional to the normal image variations of the transparency and to the thickness variations. However, the proportionality factor is different in the two cases and is substantially unity with respect to the thickness variations. Therefore, the combination of the restored transparency and the mask in masking register has the thickness variations exactly cancelled out.

If the thickness variations were accentuated by a factor greater than unity, which is much easier to do in practice than to reduce the effect of these variations, the mask is developed to a gamma which is a reciprocal of this factor, and hence, is less than unity. The combination of the transparency and the low gamma mask is thus positive with respect to the transparency.

When printing from this combination the print should be processed approximately to a gamma reciprocal to the effective gamma of the combination if the print is to have the same contrast as the original transparency. That is, the print should be processed to a gamma of $$\frac{1}{1-\frac{1}{F}}$$

The most important embodiment of the present invention is the one in which correction is made simultaneously both for color and for density variations due to thickness variations. The correction of color by a mask is well understood. Such correction is necessary mainly to compensate for deficiencies in the coloring materials used in the duplicating or printing process. The amount of correction depends on the hue of the color being corrected and it is common practice to speak of a 40% mask for one or more of the colors. The type of color correction obtained depends on the color of the printing light used when printing the mask from the colored transparency. Monochromatic yellow light has been proposed for this purpose.

According to the present invention, the original is first dyed with a dye to accentuate the density variations due to thickness with respect to the color of the mask printing light. That is, in the example just mentioned, the dye used may be neutral, blue or any color which absorbs yellow and can be washed out without materially affecting the original transparency. Of course, it is possible in the processing to correct for any slight effects on the original occasioned by the dyeing and washing out steps of the process. If the mask necessary for color correction is a P% mask, the dye selected should be such that it accentuates the variations in density due to thickness by a factor of approximately 100/P. The mask is then printed from this accentuated transparency and processed to a gamma of P/100. The transparency is then restored to the original form and combined with a mask while printing from the combination.

In this masked combination the variations due to thickness of the transparency are equal and opposite in the two elements so they cancel out. The other variations are much less in the mask and are proportional by factors which are different for the different colors. For the colors of the original which absorb the yellow mask printing light, the proportionality factor is of course P/100. For the colors fully transmitted by the mask printing light, there are no variations in the mask so that the proportionality factor is effectively zero for these particular colors.

The question naturally arises when considering the theoretical aspects of the above discussions, as to why variations in mask thickness do not cause equally detrimental effects. However, there is considerable leeway in the selection of the material for making the mask whereas the individual layers of color film are necessarily quite thin and are processed to utilize the whole thickness. The material used for making a mask is coated much thicker and therefore is easier to coat more uniformly. Furthermore, any residual non-uniformity is not so effective, first because the percentage difference in thickness is much less, and secondly, because all of the thickness is not necessarily used for forming the image therein.

In the accompanying drawing:

Figs. 1, 3, 5, 7 and 9 constitute a flow chart of the invention illustrating particularly the most preferred embodiment thereof.

Figs. 2, 4, 6 and 8 are graphs of density at various stages of the process illustrated in the other figures.

The drawing illustrates a colored motion picture 10 having therein variations in density due both to the image variations and to variations in thickness of the image layers. The latter variations do not appear separately because of the image variations, but do cause flicker when the film is projected and may be represented by the curve 20 shown in Fig. 2. These variations are shown as recurrent along the film but in practice they are not necessarily of this form. According to the invertion, a uniform dye is applied to the film 10 to give an accentuated transparency 11. As shown by the curve 21 in Fig. 4, this dyeing multiplies the density variations by a factor (about two and one-half in the example illustrated). A mask 13 is then printed from the film 11 by a printing light whose color is chosen to give the color correction desired in the final printing process. The mask is then processed to a gamma which is approximately the reciprocal of the factor by which the density variations were accentuated. In the example given, this gamma would be 1/2½ which is 40%.

As shown in Fig. 6, this mask which is negative with respect to the transparency has, in addition to the density variations due to the image, variations due to the thickness variations, the latter being illustrated by the curve 22.

After this mask 13 is printed, the dyed film 11 is bleached so as to remove only the dye added and to restore the film substantially to its original form. Obviously, the dye selected is one highly soluble in some solvent in which the dyes of the original are not soluble. I have found that water soluble dyes such as Ink Blue (Schultz #815) are satisfactory for this purpose. As shown in Fig. 7, the restored film 12 is masked by the mask 13 placed in register therewith. Since the sum of the curves 20 and 22 give a straight line 23 as shown in Fig. 8, the combination 14 of the restored original 12 and the mask 13 contains no variations or substantially no variations due to the variations represented by the curve 20. Of course, the combination has the image variations (color corrected) but these are not illustrated in the drawing.

A color duplicate may be made directly from the combination 13 or the prints may be color separation negatives to be used in imbibition or similar processes. The film 15 in Fig. 9 represents a print from the combination 13, which print is both color and flicker corrected.

Having thus described the principle of my invention and the details of the most preferred embodiment thereof, I wish to point out that it is not so limited, but is of the scope of the appended claims.

What I claim and desire to secure by Letters Patent of the United States is:

1. The method of making a corrected print from a colored transparency which comprises modifying the optical transmission of the transparency by dyeing it, printing from the modified transparency a mask negative thereto, restoring the modified transparency to its original form and masking the restored transparency by said negative mask while making a print therefrom.

2. The method of simultaneously correcting density variations due to thickness and color when printing from a colored transparency which comprises modifying the transparency to increase said density variations by a factor F measured with respect to light of the color necessary for printing a color correcting mask, printing from the modified transparency by light of said color, a color correcting mask with a gamma of 1/F and negative with respect to the modified transparency, restoring the transparency substantially to its original form, and masking the restored transparency by said negative mask while making a print therefrom.

3. The method of correcting color and density variations due to thickness when printing from a colored transparency which comprises overall dyeing the transparency, making a negative mask from the dyed transparency, removing the dye to restore the transparency substantially to its original form and masking the restored transparency by said mask when printing therefrom.

4. The method of correcting flicker in printing colored motion picture film by a process requiring a P percent color correcting mask which comprises dyeing the film to accentuate with respect to the light to be used in printing the mask the variations of density due to thickness by a factor of approximately 100/P, printing from the dyed film and by said light a mask with a gamma of P/100, bleaching the film to restore it substantially to its original form and masking the restored film by said mask while printing therefrom.

5. The combination of a colored transparency having variations in color density due both to the normal variations of the scene recorded therein and to variations in the thickness of the transparency, and in register therewith a mask for the transparency which is negative with respect to the transparency and which has variations in density substantially equal and opposite to those due to said thickness variations and has other variations in density proportional to said normal variations, the proportionality factor being for each color approximately that required for masking that color.

6. The method of compensating for density variations due to thickness variations in a photographic transparency which comprises accentuating said density variations only and by a factor $F$ greater than unity, printing from the accentuated transparency a mask with a gamma $1/F$ and negative with respect to the transparency, restoring the transparency substantially to its original form and masking the restored transparency by said mask when printing therefrom.

7. The method according to claim 6 in which the print made from the masked transparency is processed approximately to a gamma of $$\frac{1}{1-\frac{1}{F}}.$$

8. The combination of a photographic transparency having density variations proportional partly to thickness variation and partly to the image recorded therein and in register therewith a mask having variations in density opposite to those in the transparency and proportional by a factor of unity to those due to thickness and by a factor substantially different from unity to those due to the image.

9. The combination according to claim 8 in which the factor different from unity is less than unity whereby the combination is effectively positive with respect to the transparency itself.

10. The method according to claim 3 in which the dye is water soluble and said removing is washing out with water.

11. The method according to claim 3 in which the dye is Ink Blue and said removing is washing out with water.

RALPH M. EVANS.